G. Ireland,
Bottle Handle,

No. 52,373. Patented Jan. 30, 1866.

Witnesses
Alfred Taylor
E. K. Donaldson

Inventor
George Ireland
By Stephen Ustick
his attorney

UNITED STATES PATENT OFFICE.

GEORGE IRELAND, OF BIRMINGHAM, ENGLAND.

BOTTLE-HANDLE.

Specification forming part of Letters Patent No. 52,373, dated January 30, 1866; antedated January 26, 1866.

*To all whom it may concern:*

Be it known that I, GEORGE IRELAND, of the city of Birmingham, England, and Kingdom of Great Britain, have invented a new and Improved Self-Adjusting Handle for Bottles; and I do hereby declare that the following is a full, clear, and exact description of the construction and operation of the same, reference being had to the annexed drawings, making a part of this specification, in which—

Figure 1:
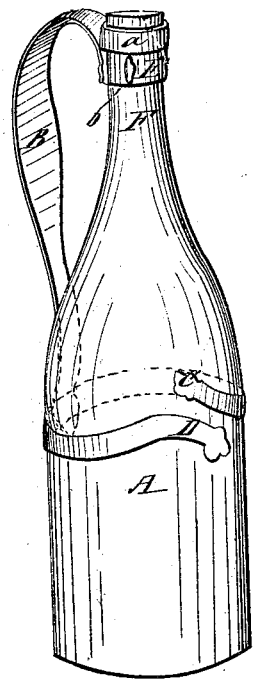
Figure 2:
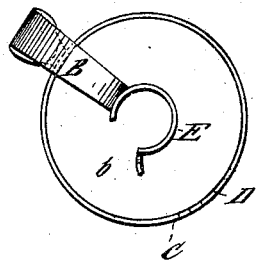

Figure 1 is a perspective view of a champagne-bottle and the improved handle in connection therewith. Fig. 2 is a top view of the handle.

Like letters in both figures represent the same parts.

The nature of my invention and improvement consists in a handle which is self-adjusting on, and easily and expeditiously removed from, champagne and other bottles, which will be understood by the following description:

A is a champagne-bottle. B is the handle, which is provided with clasps C and D that encircle the body of the bottle, and E is a clasp that encircles the greater portion of the neck F under the annular projection a.

I make the clasps of sufficient stiffness to hold the bottle securely, and with proper elasticity to make them of easy adjustment. I usually construct them and the handle of forged German silver, but do not confine myself to the use of that metal.

The operation is as follows: The handle is connected with the bottle by taking hold of the former with one hand and clasping the latter with the other hand, and then moving the handle downward, the clasps C and D passing over the neck and pressing outward as they come in contact with the body of the bottle, which they hold securely when the neck-clasp E is brought beneath the annular projection a of the neck F. The neck-clasp E is then sprung open by bearing against it at or near its connection with the handle B, and it tightly clasps the neck, as represented in Fig. 1. The handle is thus firmly connected to the body of the bottle by means of the encircling-clasps C and D, and to the neck by means of the clasp E, the annular projection a preventing its ascent.

For the removal of the handle the order is reversed. It is easily effected by pressing against the projection b on the clasp E, so as to loosen its connection with the neck F, and then pulling the handle B outward, so as to entirely remove the clasp from the neck, and finally moving the handle upward to disengage the clasps C and D from the body of the bottle.

I have represented the handle in combination with a champagne-bottle, yet it will readily appear that it is adapted to bottles of every description.

Having thus fully described my improvement in handles for bottles, what I claim therein as new, and desire to secure by Letters Patent, is—

Combining the encircling-clasps C and D and the neck-clasp E with the handle B, to form a self-adjusting handle for bottles, substantially as hereinbefore described.

In testimony that the above is my invention I have hereunto set my hand and affixed my seal this 21st day of April, 1865.

GEORGE IRELAND. [L. S.]

Witnesses:
 I. M. G. UNDERHILL,
  *Consular Agent U. S. A.,*
 JAMES H. ROUS,
  *Clerk to the said I. M. G. Underhill.*